(12) United States Patent
Kübler et al.

(10) Patent No.: US 8,398,854 B2
(45) Date of Patent: Mar. 19, 2013

(54) FILTER SYSTEM

(75) Inventors: Udo Kübler, Öhringen (DE); Dietrich Stötzer, Öhringen (DE)

(73) Assignee: Mahle International GmbH (DE)

( * ) Notice: Subject to any disclaimer, the term of this patent is extended or adjusted under 35 U.S.C. 154(b) by 385 days.

(21) Appl. No.: 12/532,544

(22) PCT Filed: Mar. 13, 2008

(86) PCT No.: PCT/EP2008/052983
§ 371 (c)(1),
(2), (4) Date: Mar. 25, 2010

(87) PCT Pub. No.: WO2008/116758
PCT Pub. Date: Oct. 2, 2008

(65) Prior Publication Data
US 2010/0193426 A1    Aug. 5, 2010

(30) Foreign Application Priority Data
Mar. 23, 2007   (DE) .......................... 10 2007 014 573

(51) Int. Cl.
| | |
|---|---|
| *B01D 25/02* | (2006.01) |
| *B01D 29/66* | (2006.01) |
| *B01D 29/54* | (2006.01) |
| *B01D 29/94* | (2006.01) |
| *B01D 35/30* | (2006.01) |
| *B01D 25/00* | (2006.01) |
| *B01D 29/00* | (2006.01) |

(52) U.S. Cl. .................. 210/333.01; 210/346; 210/335; 210/411; 210/393; 210/427

(58) Field of Classification Search ............. 210/333.01, 210/346, 335, 411, 393, 408, 427
See application file for complete search history.

(56) References Cited

U.S. PATENT DOCUMENTS
2,870,914 A    1/1959  Bloch
(Continued)

FOREIGN PATENT DOCUMENTS
| DE | 4009552 | 9/1991 |
|---|---|---|
| DE | 20011361 | 10/2000 |

(Continued)

OTHER PUBLICATIONS

EPO Machine Translation of DE4009552.*

(Continued)

*Primary Examiner* — Nam Nguyen
*Assistant Examiner* — Madeline Gonzalez
(74) *Attorney, Agent, or Firm* — Rader, Fishman & Grauer PLLC

(57) ABSTRACT

The present invention relates to a filter system (1) for removing impurities from a fluid, having a filter housing (2) enclosing a housing interior (3), and having at least one cylindrical filter body (9) provided in the filter housing (2), said filter body separating an uncleaned space (10) from a clean space (11) in the housing interior (3). In order to be able to more simply adapt the filter system (1) to different filtration levels, each filter body (9) has at least two cylindrical filter elements (12) that are designed as identical components and that are axially attached to one another.

16 Claims, 1 Drawing Sheet

U.S. PATENT DOCUMENTS

| | | | | |
|---|---|---|---|---|
| 3,144,407 A | * | 8/1964 | Olmos | 210/307 |
| 3,397,793 A | * | 8/1968 | MacDonnell | 210/457 |
| 5,435,915 A | * | 7/1995 | Connors, Jr. | 210/232 |
| 5,624,557 A | * | 4/1997 | Maurer | 210/411 |
| 2006/0118474 A1 | * | 6/2006 | Kolczyk et al. | 210/232 |

FOREIGN PATENT DOCUMENTS

| | | |
|---|---|---|
| DE | 20014299 | 2/2002 |
| GB | 550358 A | 1/1943 |
| GB | 1440814 A | 6/1976 |
| JP | 2002524227 A | 8/2002 |
| WO | WO-00/13767 A1 | 3/2000 |
| WO | WO-01/51167 | 7/2001 |

OTHER PUBLICATIONS

English abstract for DE-4009552.
English translation of office action for corresponding Japanese matter JP-2010-500187.
EP Office Action for EP 08717727.5.

* cited by examiner

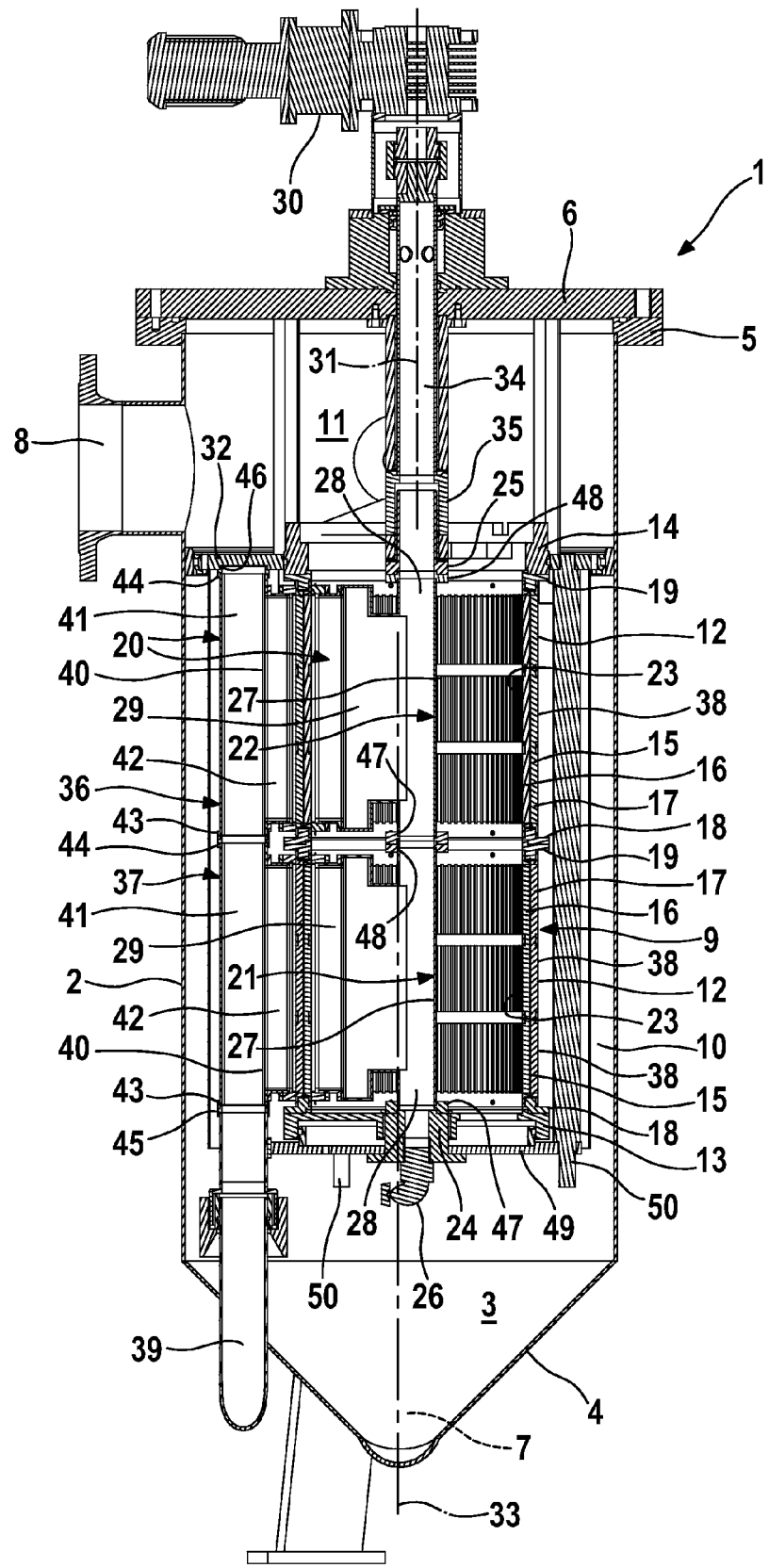

FILTER SYSTEM

CROSS-REFERENCES TO RELATED APPLICATION

This application is a National Stage application which claims the benefit of International Application No. PCT/EP2008/052983 filed Mar. 13, 2008, which claims priority based on German Patent Application No. 102007014573.1, filed Mar. 23, 2007, both of which are hereby incorporated by reference in their entirety.

The present invention relates to a filter system for removing impurities from a fluid. The invention furthermore relates to a modular system for manufacturing such filter systems. Moreover, the invention relates to a filter element for such a filter system or for such a modular system.

Filter systems of this type conventionally comprise a filter housing, enclosing a housing interior. In the filter housing there is at least one cylindrical filter body provided therein, said filter body separating an unclean space from a clean space in the housing interior. Industrial plants prefer to use such filter systems, for example in order to clean cooling lubricants.

In order to adapt such a filter system to different filtration levels, it is conventional to dimension the filter housing and the filter body according to needs. To obtain greater volume flow rates, the filter body is dimensioned correspondingly larger. As a result, the filter housing is also designed correspondingly larger.

The present invention addresses the problem of showing an advantageous way of adapting such a filter system to different filtration levels that are characterised in particular by reduced manufacturing expenses.

This problem is solves by the subject matter of the independent claims. Advantageous embodiments are the subject matter of the dependent claims.

The present invention is based on the general concept of constructing at least the filter body of the filter system in a modular fashion. filter elements that can be axially attached to one another and that are designed as identical components serve as modules in this instance. The modular design of the filter body makes it possible to vary in a particularly simple manner the axial length of the filter body in a modular grid predetermined by the axial lengths of the individual filter elements. In this manner, filter bodies having axially different lengths can be realised through the use of a different number of filter systems. Since the filter elements are designed as identical components, the costs for the forming the variants is significantly reduced.

Corresponding to an advantageous embodiment, the filter system can have a feed device for flushing the filter body with a flushing medium, the feed device having a feed body, which is arranged on the cleaned space side in the filter housing, for loading the flushing medium on one of the filter surfaces, which is opposite the cleaned space side, of the filter body. A modularly constructed fed device is now also preferred so that there is one feed device for each filter element, the feed devices being designed as identical components, axially connectable to one another, and loading the flushing substance only with the associated filter element to the filter surface opposite the cleaned space. The modular design of the filter system can thus also be realised in the field of loading equipment, which likewise through the manufacture of identical components reduces the costs for the production of variants of different lengths.

In a further advantageous embodiment, a corresponding modular design can also be realised for a delivery device for delivering deposits that have been flushed back with a flushing medium.

Additional important features and advantages of the invention can be found in the dependent claims, in the drawing, and in the pertinent description of the figures with reference to the drawing.

It is understood that the features described above and those to be described in what follows can be used not only in the particular cited combination; but also in other combinations or independently without departing from the scope of the present invention.

A preferred embodiment of the invention is shown in the drawing and is described in more detail in the following description.

The sole FIG. 1 shows a longitudinal section through a filter system.

Corresponding to FIG. 1, a filter system 1 comprises a pressure stable filter housing 2 that comprises a housing interior 3. The filter housing 2 is preferably designed cylindrically, in particular circularly cylindrically, by means of which design it exhibits the required pressure stability with a comparably lesser wall thickness. The filter housing 2 is closed at one end by a cone shaped floor 4. On the other end, the filter housing 2 has a flange 5 to which a covering 6 is attached for sealing the filter housing 2. The filter housing 2 has on the floor 4, for example, an intake 7, which is in the uncleaned space and is not recognisable in the selected section level, through which intake the unfiltered fluid is fed to the filter housing 2. Furthermore, the filter housing 2 has a return line 8, which is on the clean space side, by means of which the cleaned fluid is removed from the filter housing 2.

The filter system 1 has at least one filter body 9 that is arranged in the filter housing 9 and that is designed cylindrically, preferably circularly cylindrically. Advantageously, the filter body 9 with its longitudinal centre line 31 and the housing 2 with its longitudinal centre line 33 are arranged axially parallel to one another. A slight eccentricity is preferred. The filter body 9 separates in the housing interior 3 an uncleaned space 10, which communicates with the intake 7, from a clean space 11, which communicates with the return line 8. In the example shown, the clean space 11 extends into the interior of the filter body 9, while the uncleaned space 10 encloses the filter body 9 from the exterior. During filtering, the filter body 9 is thus flowed through from the exterior to the interior. It is evident that, in principle, a reversed direction of flow through the filter body 9 during the cleaning process can also be provided, so that the cleaned space can be arranged on the exterior and the unclean space on the interior.

In the example shown, the filter body 9 has two filter elements 12 that are each designed cylindrically or circularly cylindrically. Furthermore, the filter elements 12 are axially attached to one another. It is evident that in a different embodiment, the filter system 1 can also be provided with more than two such filter elements 12 in order to assemble each respective filter body 9. Likewise, another conceivable design for the filter system 1 in which the filter body 9 has only one single filter element 12 of this type.

The filter body 9 has on each of its axial ends an end body, namely a floor side end body 13 that is opposite the floor 4 and a cover side end body 14 that is opposite the covering 6. Both of the end bodies 13, 14 are attached to different filter elements 12.

The filter body 9 in the shown example is thus constructed exclusively of the filter elements 13 and the end bodies 13, 14 and attachment means necessary therefor. Furthermore, the filter body 9 constructed in such a manner is inherently stabile and self supporting.

Each filter element 12 has a casing 15 that is designed cylindrically or circularly cylindrically and develops the desired filter effect during the operation of the filter system 1. For example, the filter body 9 or the respective filter element 12 can be designed in the style of an edge filter. The casing 15 comprises in the embodiment shown here a radially internal, pressure stabile and cylindrical support structure 16 that supports a cylindrical filter structure 17 radially externally. Furthermore, the each filter element 12 has on each of its axial ends an annular body, namely a floor side annular body 18 that is opposite the floor 4 and an covering side annular body 19 that is opposite the covering 6. The annular bodies 18, 19 are designed as flanges that are complementary to one another, said flanges making it possible to attach the one filter element 12 by means of its floor side annular body 18 to the covering side annular body 19 of the other filter element 12. What's more, the annular bodies 18, 19 of the filter elements 12 are designed to be complementary to end bodies 13, 14 of the filter body 9. This means that the individual floor side annular bodies 18 and the floor side end bodies 14 form flanges that are complementary to one another. In a corresponding manner, each of the covering side annular bodies 9 and the cover side end bodies form flanges that are complementary to one another. Correspondingly, the floor side end bodies 13 can be attached to the floor side annular bodies 18 of the filter elements 12 arranged on the floor side, while the cover side end bodies 14 can be attached to the covering side annular bodies 19 of the filter elements 12 arranged on the covering side.

The example shown concerns a regenerative or a back flush filter body 9. In the filter system 1 shown here, a back flush device 20 is provided for the regeneration of the filter body 9 during operation. The back flush device 20 comprises a feed device 21 that is designed to provide or feed a suitable flushing medium for the back flushing of the filter body 9. Suitable flushing mediums are, for example, a flushing gas, such as compressed air, for example, or a flushing liquid, such as the purified fluid removed from the cleaned space. The feed device 21 has a feed body 22 that is arranged in the on the cleaned space side of the filter housing 2. Accordingly, the feed body 22 is also located in the example shown in the interior of the filter body 9. The filter body 22 is designed in such a manner that is suited to feeding a the flushing medium to here an internal filter surface 23 of the filter body 9, said filter surface being opposite the cleaned space. For this purpose, the filter body 22 is connected to a feed line 26 by means of floor side connection 24 and/or by means of a covering side connection 24, by means of which feed line the respective flushing medium can be supplied to the filter body 22. The floor side connection 24 is attached to a floor plate 49 that is attached to the intermediate floor 32 by a plurality of tensioning bolts 50.

The filter body 22 preferably has for each filter element 12 a separate feed element 27. In the example, two feed elements 27 are thus provided. The feed elements 27 are each designed as identical components and can be attached to one another axially. Furthermore, the individual supple elements 27 are dimensioned in such a manner that they feed the respective flushing medium to the internal filter surface 23 with the associated filter element 12. In this manner, the covering side feed element 27 exclusively impinges upon the internal filter surface 23 of the covering side filter element 12 with flushing medium, while the floor side feed elements exclusively impinge upon the internal filter surface 23 of the floor side filter element 12 with flushing medium.

Each feed element 27 has a feed canal body 28 as well as a nozzle body 29, which connectedly communicates therewith, for the flushing medium impingement of the internal filter surface 23. The individual nozzle body 29 is designed in such a manner that only a comparably small peripheral segment of the internal filter surface 23 can be impinged upon by the flushing medium with said nozzle. At the same time, each nozzle body 29 extends over the entire axial height of each internal filter surface 23 associated therewith. By means of this design, the back flushing with a flushing medium can be concentrated on to a comparably small section of the internal filter surface 23.

The filter system 1 moreover has a drive 30 that makes a relative movement possible between the nozzle bodies 20 and the internal filter surfaces 23 associated therewith in the peripheral direction of the internal filter surfaces 23. For this purpose, it is preferred that the filter body 9 is rotatably arranged about its longitudinal centre line in the filter housing 2. A corresponding rotating bearing can be achieved, for example, by means of the end bodies 13, 14. For example, to this end, the floor side end body 13 is rotatably mounted on the floor side connection 24, while the covering side end body 14 is rotatably mounted on an intermediate floor 32 in the housing 2.

The drive 30 works together with the covering side end body by means of a drive shaft 34 and a drive flange connected thereto in a rotationally fixed manner in order to drive the filter body 9 in a rotational manner. The drive shaft 34 is designed as hollow and can thereby form a component part of the feed device 21.

The flush back device 20 of the filter system 1 shown here moreover has a discharge device 36 by means of which the deposits can be discharged that were separated or removed during the back flushing process of the filter body 9. For this purpose, the discharge device 36 has a discharge body that is arranged in the filter housing 2 on the uncleaned side, that is to say external to the filter body 9. The DB 37 makes possible the discharge of the deposits flushed back with the flushing medium from a here external filter surface 38 of the filter body 9, said filter surface being opposite the uncleaned side 3. During the filtration process, impurities collect on the uncleaned side, that is to say externally on the filter body 9 on said filter surface 38, said impurities forming deposits. Since such deposits considerably increase current resistance, they are removed by means of back flushing. During the back flushing process, the respective flushing medium flows against the filter system, in this instance through the filter body 9 from the inside to the outside, which leads to the desired separation of the deposits. The DB 37 can now take up and discharge the flushing medium used during the back flushing along with flushed back or detached deposits. For example, the DB 37 is connected here to a corresponding discharge canal 39 that leads out of the housing 2. For each filter element 12, the DB 37 has a discharge element 40. In the present example, precisely two such discharge elements 40 are thus provided. The discharge elements 40 are designed as identical components and are attached to one another axially. Furthermore, the individual discharge elements 40 are designed in such a manner that they discharge the deposits flushed back by the associated filter elements 12 from the respective external filter surfaces 38.

Individually, each discharge element 40 consists of a discharge canal 41 and an inlet body 42 connected thereto in a communicating fashion, for example. Each individual inlet body 42 is designed in such a manner that with a circumferentially limited circumferential segment of the external filter surface 38, the flushed back deposits can be gathered along the entire axial height of the external filter surface 38 of the respective filter element 12. For this purpose, the respective inlet body 42 is advantageously positioned as flush with each respective nozzle body 29 of the corresponding feed element 27 on the filter body 9 or on the respective filter element 12. A radial back flush region is thus designed between the nozzle bodies 29 and the inlet bodies 42, the filter bodies 9 or the filter elements being tangentially guided through said back flush region.

The axial ends of the discharge elements 40 are each provided with connection flanges 43 or 44 that are designed as being complementary to one another. In this manner, two or more discharge elements 40 can easily be axially connected to each other. Moreover, the connection flanges 43, 44 are designed so as to be complementary to a connection 45 or complementary to a fixture 46 which makes it possible to connect and fix the discharge body 36 in the filter housing 2.

In a corresponding manner, the axial ends of the feed elements 27 are equipped with connection flanges 47 or 48 that are designed to be complementary to one another and make it possible to attach axially two or more such feed elements 27 to each other. Moreover, the connection flanges 47, 48 are designed to be complementary to the floor side connection 24 or to the covering side connection 25 by means of which the integration of the feed body 22 in the remaining feed device 21 is realisable.

In manufacturing filter systems 1 of this type, it is advantageous to provide a modular construction system that has the filter element 12 as well as different filter housings 2. Moreover, this modular construction system can also comprise the feed element 7 and/or the discharge element 40. A modular construction method is realised for the filter system 1 in this way. In particular, different filter bodies 9 can be designed that differ from one another with regard to their axial length. In this manner, the different axial lengths can be realised in that to construct the individual filter bodies 9, only one singe filter element 12 or two filter elements 12 or a plurality of filter elements 12 can be used. Corresponding thereto, the back flush device 20 can also be adapted. For example, the feed body 22 is then designed from a single feed element 27 or from two or more feed elements 27. Analagous thereto is that the discharge body 37 can also be assembled of a single discharge element 40 or of two or more discharge elements 40. The filter housings 2 made available in the modular construction system differ from each other with regard to their axial length, namely in the grid defined by the axial lengths of the filter elements 12.

By means of the suggested modular construction method of the filter body 9 as well as preferably of the feed body 22 and/or of the discharge body 37, filter systems 1 having different filtration level capacities can be provided with relatively minimal outlay.

The invention claimed is:

1. A filter system for removing impurities from a fluid, comprising:
   a pressure stable filter housing enclosing a housing interior that has a clean region and an unclean region, and
   at least one cylindrical filter body provided in the housing interior,
   wherein each filter body has at least two cylindrical filter elements that are designed as generally identical modular components and that are axially attached to one another and wherein:
   i. a feed device is provided that is configured to perform a back flushing operation on the filter body with a flushing medium,
   ii. the feed device has a feed body that is arranged in the clean region of the housing interior and
   iii. the feed body comprises a feed element for each filter element, said feed elements being designed as generally identical modular components, wherein
      a. each feed element feeds the flushing medium to the clean side filter surface of an associated filter element,
      b. each feed element comprises a feed canal body and a nozzle body fixedly connected thereto in a communicating fashion and is configured such that a circumferential segment of the clean side filter surface of the associated filter element is impinged upon with the flushing medium over an entire axial height thereof, and
      c. the feed canal bodies are axially connected to one another with a common axis being parallel to the axis of the filter body.

2. A filter system for removing impurities from a fluid, comprising:
   a pressure stable filter housing enclosing a housing interior that has a clean region and an unclean region, and
   at least one cylindrical filter body provided in the housing interior,
   wherein each filter body has at least two cylindrical filter elements that are designed as generally identical modular components and that are axially attached to one another and wherein:
   i. a discharge device is provided that is configured to remove deposits that have been flushed back with a flushing medium,
   ii. the discharge device has a discharge body, which is arranged in the unclean region, and
   iii. the discharge body has a discharge element for each filter element, said discharge elements being designed as generally identical modular components, wherein
      a. each discharge element discharges from an unclean side filter surface of an associated filter element the deposits flushed back with the flushing medium,
      b. each discharge element comprises a discharge canal and an inlet body connected thereto in a communicating fashion and is configured such that the deposits flushed back with the flushing medium are selectively gathered from a circumferential segment of the unclean side filter surface of the associated filter element along an entire axial height, and
      c. the discharge canals are axially connected to each other with a common axis being parallel to the axis of the filter body.

3. The filter system as specified in claim 1, wherein:
   i. a discharge device is provided that is configured to remove deposits that have been flushed back with a flushing medium,
   ii. the discharge device has a discharge body, which is arranged in the unclean region, and
   iii. the discharge body has a discharge element for each filter element, said discharge elements being designed as generally identical modular components, wherein
      a. each discharge element discharges from an unclean side filter surface of an associated filter element the deposits flushed back with the flushing medium,
      b. each discharge element comprises a discharge canal and an inlet body connected thereto in a communicating fashion and is configured such that the deposits flushed back with the flushing medium are selectively gathered from a circumferential segment of the unclean side filter surface of the associated filter element along an entire axial height, and
      c. the discharge canals are axially connected to each other with a common axis being parallel to the axis of the filter body.

4. A filter system for removing impurities from a fluid, comprising:
   a pressure stable filter housing enclosing a housing interior that has a clean region and an unclean region, and
   at least one cylindrical filter body provided in the housing interior,
   wherein each filter body has at least two cylindrical filter elements that are designed as generally identical modular components and that are axially attached to one another and wherein:
   the filter body has an end body on each axial end, said end bodies being attached to different filter elements;
   each filter element has:

a cylindrical casing that performs filtration during operation of the filter system, the casing comprising a cylindrical filter structure in contact with a cylindrical support structure that is pressure stable and supports the filter structure radially in an external direction, and two annular bodies each arranged on a different axial end of the casing, wherein said annular bodies are flanges that are complementary to one another;

a feed device is provided that is configured to perform a back flushing operation on the filter body with a flushing medium;

the feed device has a feed body that is arranged in the clean region of the housing interior;

the feed body comprises a feed element for each filter element, said feed elements being designed as generally identical modular components, wherein
 a. each feed element feeds the flushing medium to the clean side filter surface of an associated filter element,
 b. each feed element comprises a feed canal body and a nozzle body fixedly connected thereto in a communicating fashion and is configured such that a circumferential segment of the clean side filter surface of the associated filter element is impinged upon with the flushing medium over an entire axial height thereof, and
 c. the feed canal bodies are axially connected to one another with a common axis being parallel to the axis of the filter body;

a discharge device is provided that is configured to remove deposits that have been flushed back with a flushing medium;

the discharge device has a discharge body, which is arranged in the unclean region; and the discharge body has a discharge element for each filter element, said discharge elements being designed as generally identical modular components, wherein
 d. each discharge element discharges from an unclean side filter surface of an associated filter element the deposits flushed back with the flushing medium,
 e. each discharge element comprises a discharge canal and an inlet body connected thereto in a communicating fashion and is configured such that the deposits flushed back with the flushing medium are selectively gathered from a circumferential segment of the unclean side filter surface of the associated filter element along an entire axial height, and
 f. the discharge canals are axially connected to each other with a common axis being parallel to the axis of the filter body.

5. The filter system as specified in claim 1, wherein the feed body is fixed relative to the filter housing.

6. The filter system as specified in claim 2, wherein the discharge body is fixed relative to the filter housing.

7. The filter system as specified in claim 3, wherein the feed body and the discharge body are both fixed relative to the filter housing, and the discharge body and the feed body are disposed such that, for each filter element, an end of an associated inlet body that gathers deposits is fixedly located directly opposite in a radial direction an end of an associated nozzle body that expels the flushing medium, with the casing of the respective filter element located therebetween.

8. The filter system as specified in claim 7, further comprising a drive device attached to the filter housing, wherein:
 the filter housing is configured such that the filter body can rotate relative to the filter housing, and
 the drive device is configured to rotate the filter body around its axis relative to the filter housing.

9. The filter system as specified in claim 4, wherein the axis of the filter body is parallel to, but not coaxial with, the axis of the filter housing.

10. The filter system as specified in claim 4, wherein the casing is a metal edge filter.

11. The filter system as specified in claim 1, wherein the filter body has an end body on each axial end, said end bodies being attached to different filter elements.

12. The filter system as specified in claim 11, wherein each filter element has:
 a cylindrical casing that performs filtration during operation of the filter system, the casing comprising a cylindrical filter structure in contact with a cylindrical support structure that is pressure stable and supports the filter structure radially in an external direction; and
 two annular bodies each arranged on a different axial end of the casing, wherein said annular bodies are flanges that are complementary to one another.

13. The filter system as specified in claim 1, wherein each filter element has:
 a cylindrical casing that performs filtration during operation of the filter system, the casing comprising a cylindrical filter structure in contact with a cylindrical support structure that is pressure stable and supports the filter structure radially in an external direction; and
 two annular bodies each arranged on a different axial end of the casing, wherein said annular bodies are flanges that are complementary to one another.

14. The filter system as specified in claim 2, wherein the filter body has an end body on each axial end, said end bodies being attached to different filter elements.

15. The filter system as specified in claim 14, wherein each filter element has:
 a cylindrical casing that performs filtration during operation of the filter system, the casing comprising a cylindrical filter structure in contact with a cylindrical support structure that is pressure stable and supports the filter structure radially in an external direction; and
 two annular bodies each arranged on a different axial end of the casing, wherein said annular bodies are flanges that are complementary to one another.

16. The filter system as specified in claim 2, wherein each filter element has:
 a cylindrical casing that performs filtration during operation of the filter system, the casing comprising a cylindrical filter structure in contact with a cylindrical support structure that is pressure stable and supports the filter structure radially in an external direction; and
 two annular bodies each arranged on a different axial end of the casing, wherein said annular bodies are flanges that are complementary to one another.

* * * * *